United States Patent
Rogers et al.

(10) Patent No.: US 7,818,610 B2
(45) Date of Patent: Oct. 19, 2010

(54) RAPID CRASH RECOVERY FOR FLASH STORAGE

(75) Inventors: Andrew M. Rogers, Bellevue, WA (US); Aman Kansal, Issaquah, WA (US); Sachin Chiman Patel, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 435 days.

(21) Appl. No.: 11/863,023

(22) Filed: Sep. 27, 2007

(65) Prior Publication Data

US 2009/0089610 A1 Apr. 2, 2009

(51) Int. Cl.
*G06F 11/00* (2006.01)
(52) U.S. Cl. ............... 714/6; 714/5; 714/10; 714/15
(58) Field of Classification Search .......... 714/5, 714/6, 10, 15
See application file for complete search history.

(56) References Cited

U.S. PATENT DOCUMENTS

| | | | |
|---|---|---|---|
| 5,845,082 A * | 12/1998 | Murakami | 709/226 |
| 5,968,173 A * | 10/1999 | Watts, Jr. | 713/2 |
| 6,172,915 B1 | 1/2001 | Tang et al. | |
| 6,336,161 B1 * | 1/2002 | Watts | 711/103 |
| 6,678,787 B2 * | 1/2004 | Petruschka et al. | 711/112 |
| 6,853,585 B2 | 2/2005 | Lee et al. | |
| 6,854,115 B1 | 2/2005 | Traversat et al. | |
| 6,941,410 B1 | 9/2005 | Traversat et al. | |
| 7,032,081 B1 | 4/2006 | Gefen et al. | |
| 7,170,801 B2 | 1/2007 | Lee et al. | |
| 7,283,397 B2 | 10/2007 | Harari et al. | |
| 7,373,558 B2 * | 5/2008 | Mukherjee | 714/48 |
| 7,424,499 B2 * | 9/2008 | Lomet | 707/206 |
| 7,516,267 B2 * | 4/2009 | Coulson et al. | 711/103 |
| 7,549,083 B2 * | 6/2009 | Eguchi et al. | 714/15 |
| 7,571,347 B2 * | 8/2009 | Gross et al. | 714/15 |
| 7,587,429 B2 * | 9/2009 | Liedes et al. | 707/202 |
| 7,627,728 B1 * | 12/2009 | Roeck et al. | 711/162 |
| 7,634,687 B2 * | 12/2009 | Haselden et al. | 714/15 |
| 2002/0078244 A1 | 6/2002 | Howard | |
| 2005/0050386 A1 * | 3/2005 | Reinhardt et al. | 714/13 |
| 2005/0132250 A1 * | 6/2005 | Hansen et al. | 714/5 |
| 2006/0129614 A1 | 6/2006 | Kim et al. | |
| 2007/0168698 A1 * | 7/2007 | Coulson et al. | 714/5 |
| 2007/0177423 A1 | 8/2007 | Cho | |

OTHER PUBLICATIONS

BadCopy Pro—Flash Drive Data Recovery Software Thumb Drive, JumpDrive, Pen Drive Data Recovery and File Recovery Software http://www.jufsoft.com/badcopy/flash_drive_recovery.asp?rid=google&kid=gfr0101. Last accessed Oct. 20, 2007, 2 pages.

(Continued)

*Primary Examiner*—Robert Beausoliel
*Assistant Examiner*—Joshua P Lottich
(74) *Attorney, Agent, or Firm*—Turocy & Watson, LLP

(57) ABSTRACT

Recovery is expedited for crashes involving flash memory. Rather than requiring an entire flash memory to be read to reconstruct lost information, only a subset of the memory need be read thereby reducing system down time, among other things. In particular, state information such as a logical to physical mapping is captured via a checkpoint operation periodically. Moreover, a deterministic usage pattern is employed to facilitate recovery of actions performed after a checkpoint.

20 Claims, 12 Drawing Sheets

OTHER PUBLICATIONS

USB Flash Drive Data Recovery 2.0.1.5 http://www.freedownloadscenter.com/Utilities/File_Maintenance_and_Repair_Utilities/USB_Flash_Drive_Data_Recovery.html. Last accessed Oct. 20, 2007, 2 pages.

Daniel Parthey, et al. Timing Properties of Removable Flash Media http://rtg.informatik.tu-chemnitz.de/docs/pubs/jrwrtc07.pdf. Last accessed Oct. 20, 2007, 4 pages.

Micron, 4Gb, 8Gb, and 16Gb×8 NAND Flash Memory Specifications: NAND Flash Memory: MT29F4G08AAA, MT29F8G08BAA, MT29F8G08DAA, MT29F16G08FAA. Micron Technology, Inc. 2006.

Intel AP-684 Application Note: Understanding the Flash Translation Layer (FTL) Specification. Dec. 1998.

* cited by examiner

RAPID CRASH RECOVERY FOR FLASH STORAGE

BACKGROUND

Flash memory is a type of non-volatile memory that can be electrically programmed and erased. Its most common use is storing control code for a computer BIOS (Basic Input Output System). However, this technology is becoming increasingly popular for removable solid-state devices including memory cards for digital devices (e.g., camera, phone, audio player, personal digital assistant (PDA), recorder, game system, set-top box, network switches, embedded controllers . . . ) and USB drives (e.g., thumb drive, flash stick, jump drive . . . ) to facilitate storage and transfer of data between and amongst digital devices and/or computers. Its popularity is due to the many advantages it has over other types of non-volatile memory such as a hard disk: flash memory is noiseless, small in size, light in weight, provides fast access, and has higher reliability as it does not contain moving parts.

At present, there are two major types of flash memory used in the market: NAND (NAND gate) and NOR (NOR gate). NAND flash is a media divided into a collection of blocks, which are further subdivided into pages anywhere from the traditional 512 bytes in size to 2 KB in size for large-block NAND. Each page is then further divided into two distinct sections, namely a data area used to store information and an extra area to store additional information (e.g., metadata). NOR flash is a media that is segmented into a collection of blocks and all bytes are individually addressable. For instance, NOR flash memory can be split into a series of contiguous blocks (e.g., 1 through N) and similar to conventional RAM, every byte in these blocks is individually addressable.

Both NAND and NOR flash conventionally suffer from several physical constraints. First, write operations can typically only set a logical "1" to a logical "0." Second, erasing a block sets all the bits in the block to a logical "1." Further, only blocks can be erased. It is not possible to erase individual pages/bytes in a block without erasing all pages/bytes within the same place. Blocks also have limited erase or write/erase lifetimes.

Various mechanisms/techniques are often employed in view of the above flash memory characteristics. For instance, wear-leveling techniques are utilized on a media to maximize its lifetime. Additionally, a technique for effectively erasing blocks without losing data is frequently used. Further, error correction codes (ECC) are conventionally used to safeguard against data corruption due to leaks, for example.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to rapid crash recovery for flash memory and like storage mechanisms. During flash memory usage, certain storage related data and/or metadata (e.g., logical to physical mapping, page usage states . . . ) is often loaded to volatile host device memory to facilitate processing and subsequently shifted to persistent memory upon shut down. However, flash memory host devices may crash without a clean shut down, for instance where there is a sudden loss of power, and hence do not get a chance to transfer the updated data and/or metadata from volatile memory to persistent storage. Accordingly, safeguards are needed to guard against data loss during failure situations. Conventional recovery techniques are expensive in terms of both time and energy. Provided is a rapid crash recovery mechanism that helps reduce system reboot time, user annoyance, and critical response and control latency, among other things, for devices that employ flash memory (e.g., NAND) or the like.

In accordance with one aspect of the disclosure, checkpointing can be utilized to aid recovery. Checkpointing refers to a periodic process of persisting state information among other things to a non-volatile store such as flash memory and/or a host device store. Nevertheless, there is often a period of time between a checkpoint and a crash in which additional changes are made that are not captured by the checkpoint operation. As a result, the entire flash memory may need to be read to recreate or redo the changes made subsequent to the checkpoint.

According to another aspect of the disclosure, a deterministic usage pattern can be employed such that only a small portion of flash memory need be read in order to discover changes since the last checkpoint. The deterministic usage pattern defines a predictable manner in which flash memory will be used. Consequently, physical memory locations that would have changed after the checkpointing but before the crash can be identified without reading the entire flash memory. Only these locations need to be read to discover lost changes.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Crash recovery systems and methods related to flash memory and like storage are detailed hereinafter. Flash memory host devices can crash occasionally without a clean shut down, for instance where a user powers down a device suddenly by removing the battery or unplugging it. As a result, state and other information resident in host volatile memory is lost. Most lost information can be recreated by reading the entire flash memory. However, this is an expensive operation in terms of time and energy. A more efficient crash recovery mechanism is provided that allows recreation of state that requires reading of only a subset of the flash memory. More specifically, checkpoints and various deterministic usage patterns are utilized to enable regeneration of lost information without scanning an entire flash memory. This improves post-crash operation of any device that employs flash memory.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
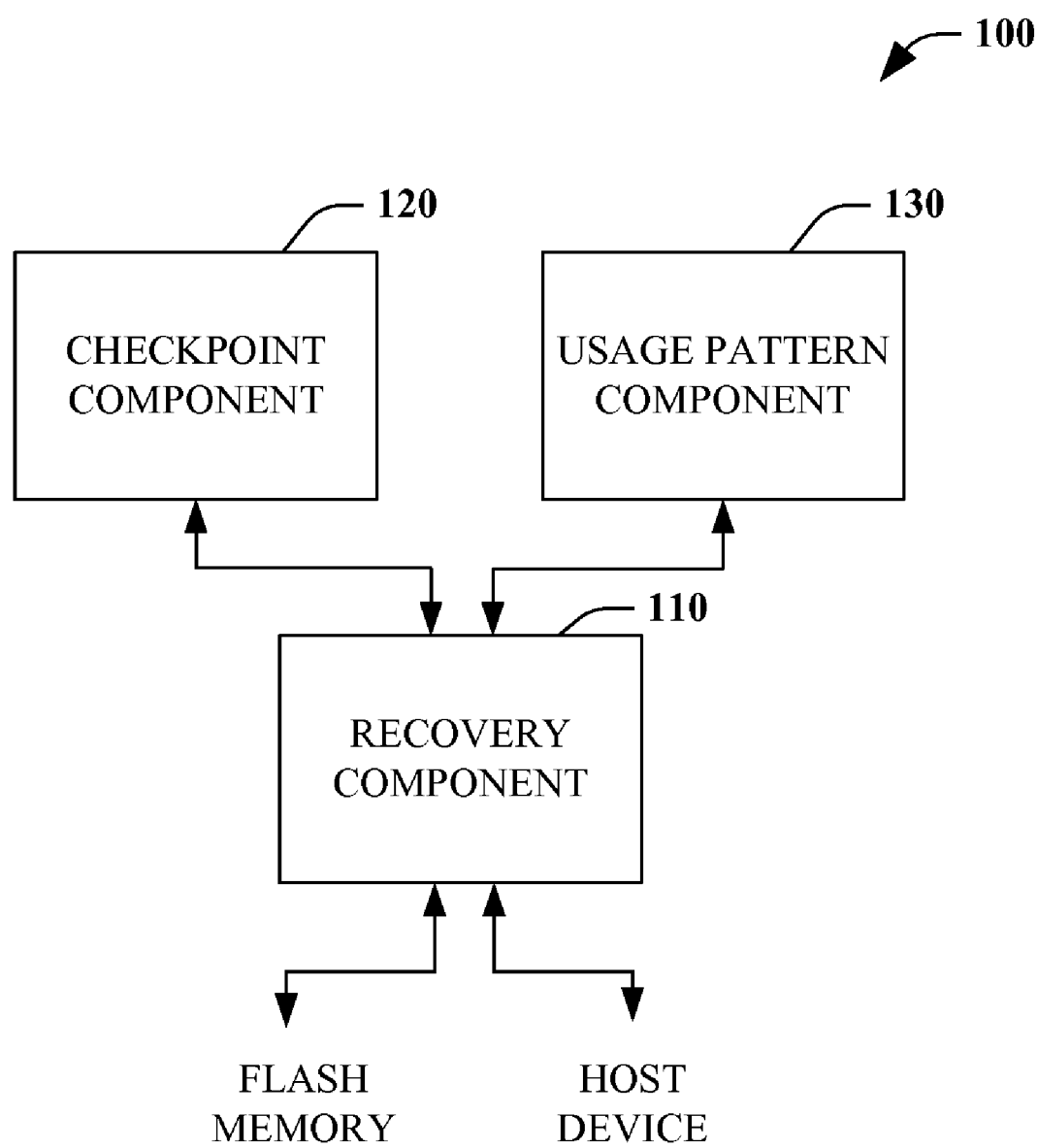
FIG. 1 is a block diagram of a rapid crash recovery system in accordance with an aspect of the disclosed subject matter.

Referring initially to FIG. 1, a rapid crash recovery system 100 is depicted in accordance with an aspect of the claimed subject matter. The system 100 includes a recovery component 110 that can interact with a flash memory and a host device (e.g., computer, controller, embedded component, mobile device (e.g., phone, camera, recorder, audio player . . . ) . . . ). Accordingly, the recovery component 110 can be embodied in a flash memory device driver, microcontroller, and/or within processing platforms of the flash memory device or the host device, among other things. Upon a crash caused by a sudden loss of power, for example, the recovery component 110 recovers lost data and/or information.

Data is lost as result of the manner in which flash memory data is processed. In particular, the host device typically stores at least a portion of data and/or state information in volatile memory (e.g., Random Access Memory (RAM)) to facilitate expeditious processing. Consequently, if the host device loses power prior to persisting the information to a non-volatile store such as the flash memory itself and/or a host device store (e.g., hard drive), at least some information is lost. However, not everything is forever lost. Some information can be recreated or regenerated.

Flash memory and like storage technologies store specialized data, known as metadata, describing the stored data. In fact, a portion of each page in NAND flash is designated to provide such information. This metadata can be utilized to reconstruct information including logical to physical mappings and other state information, among other things after a crash. Unfortunately, this requires interrogating the entire flash memory—every page in a NAND flash device. This is very expensive in terms of both time and energy. For example, scanning the entire flash memory would result in a lengthy re-booting process that negatively affects the life of a host device battery.

Checkpoint component 120 and/or usage pattern component 130 can be employed by system 100 to expedite the recovery process. The checkpoint component 120 periodically persists state and/or other information to a non-volatile store such as the flash memory. This can be done periodically and/or upon the occurrence of particular events. As a result, upon failure due to a sudden power loss, for instance, the checkpoint or checkpoint data can be utilized to restore lost metadata in the volatile memory. However, checkpointing alone will not be enough since additional changes are likely to have been made between a checkpoint and a crash. To recover the lost changes, the entire flash memory would probably still have to be read.

The usage pattern component 130 enables identification of changes without having to scan the entire flash memory. More specifically, the component 130 can dictate a deterministic manner in which flash memory is to be used. Consequently, changes or the locations (e.g., page address) of the changes made since the last checkpoint can be easily identified on the flash device. For example, suppose checkpointing was performed at time "t1" and a crash occurs at time "t2." Utilizing a deterministic usage mechanism, the identity of physical pages that would have changed after the checkpointing but before the crash can be identified. As a result, only these pages will need to be scanned to discover lost changes and/or information pertaining thereto.

Figure 2:
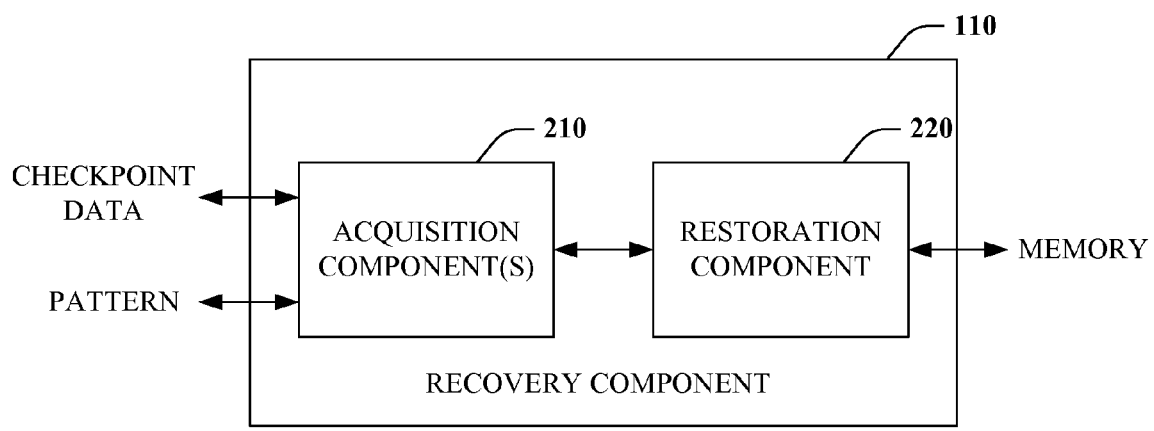
FIG. 2 is a block diagram of a representative recovery component.

FIG. 2 illustrates a representative recovery component 110 in accordance with an aspect of the claimed subject matter. The recovery component 110 includes an acquisition component 210 and a restoration component 220. The acquisition component 210 receives, retrieves or otherwise obtains or acquires a checkpoint or checkpoint data as well as a pattern and/or pattern related data. A checkpoint corresponds to state capture at a particular moment in time. This persistent data can be located on the flash memory device and/or host device, among others. A pattern defines a deterministic usage mechanism that facilitates identification of changes subsequent to a checkpoint and prior to a crash. The pattern itself, alone or in combination with associated data such as a seed value, can be resident on a non-volatile media including but not limited to flash memory or a host device store. The acquisition component 110 can provide or otherwise make this information available to the restoration component 220, which can utilize this information to restore state prior to a crash or other failure.

Figure 3:
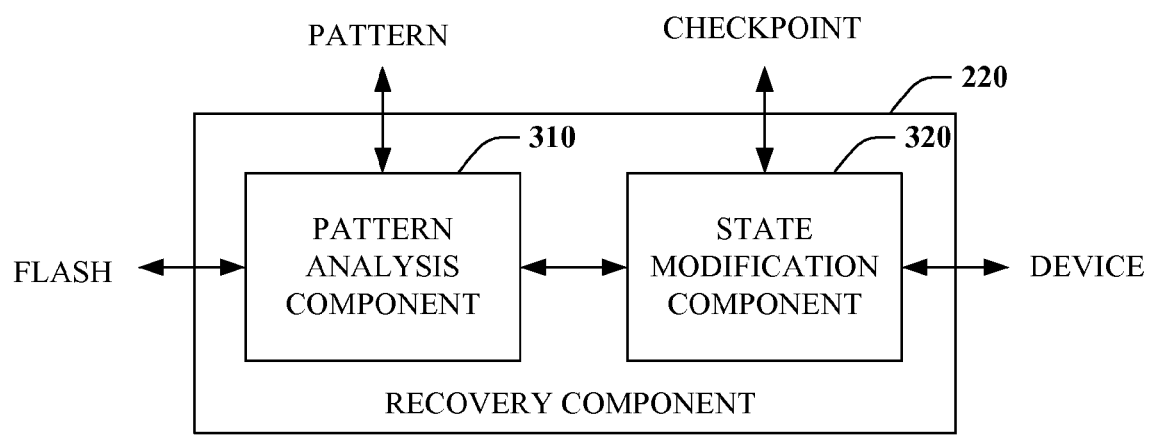
FIG. 3 is a block diagram of a representative restoration component.

A representative restoration component 220 is illustrated in FIG. 3 in accordance with an aspect of the claimed subject matter. As shown, the restoration component 220 can include a pattern analysis component 310 communicatively coupled to a state modification component 320. The pattern analysis component 310 utilizes a designated pattern to identify a subset of flash memory locations that may include changes subsequent to a checkpoint. The pattern analysis component 310 can iterate across each location acquiring data and/or metadata associated with the location. This can continue until either the end of the pattern is reached or a location is void of any data.

The state modification component 320 receives, retrieves or otherwise obtains or acquires data and/or metadata from the pattern analysis component 310 and modifies the associated most recent checkpoint state in accordance therewith. This can be accomplished iteratively as data and/or metadata is acquired or as a batch process upon acquisition of the entire set of data and/or metadata. In effect, discovered lost actions can be redone such that the state is rolled forward to a time just before the crash. At least a portion of this updated data can then be cached by a host device and processing resumed where it left off prior to the crash, for instance.

What follows is an exemplary scenario to facilitate clarity and understanding with respect to aspects of the claimed subject matter. The example is not intended to limit the scope of the claims but rather to aid the reader in understanding how disclosed aspects can be employed with respect to a concrete situation. Various other examples and/or situations are possible and are to be considered within the scope of the claimed subject matter.

Figure 4:
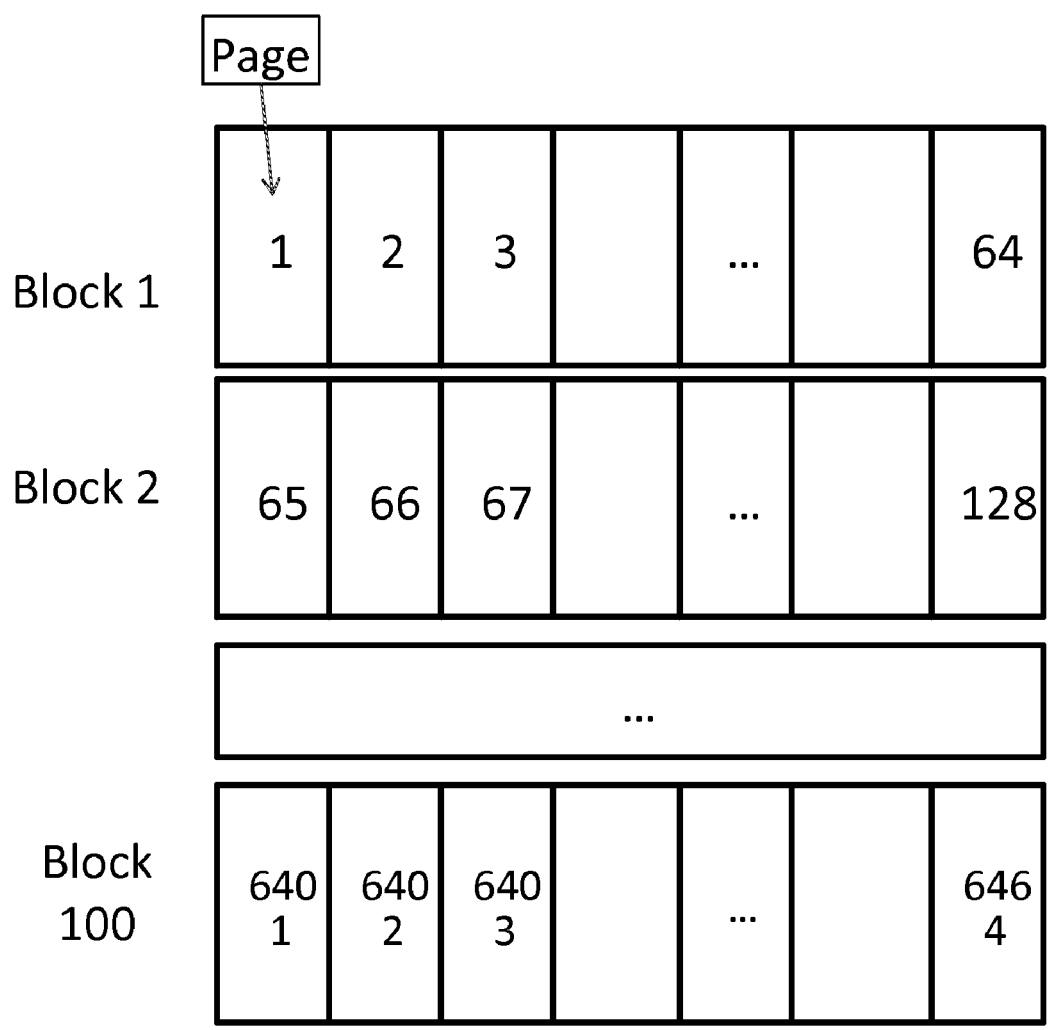
FIG. 4 is an exemplary NAND flash organization showing read/write and erase units.

NAND flash storage devices have a property that a sector (also referred to as a flash page) can be written only once and writing it again requires a large group of flash pages (also referred to as a flash block) to be erased. Erasing the flash block is an expensive operation especially when other pages in the block contain useful data. See, for instance, FIG. 4, showing several blocks, each containing 64 pages. Suppose page "1" in block "1" is written once. Now, if page "1" is to be written again, entire block "1" (containing pages 1 to 64) needs to be deleted. Any useful data in the pages to be deleted must be moved out before the erase and replaced back after the erase. Instead, a more efficient and generally used approach is to maintain a logical mapping in the volatile memory (RAM). Here, if page "1" is to be re-written, some other empty page is selected (e.g., one that has not been written after an erase), say page "67" in block "2." The data for the updated page "1" is written to page "67." The mapping in volatile memory is used to store the fact that logical page "1" is written to physical page "67." The physical page "1" in block "1" is now useless (e.g., denoted dirty), and at some other time, block "1" may be erased and page "1" in block "1" used for writing out some other logical page. The mapping in the memory thus helps avoid block erase overhead for each page re-write. Instead, a block may be erased when many of its pages are dirty.

Further, it is advantageous to use the flash uniformly and avoid re-writing to a few pages repeatedly since flash pages do wear out with excessive use (also referred to as wear leveling requirement). The application using the flash page may write a few selected pages repeatedly. A flash driver or the like can maintain a mapping from the logical page addresses used by the memory to the physical page addresses and continue to change the physical pages uniformly across the flash storage to avoid wearing out a few selected pages.

Figure 5:
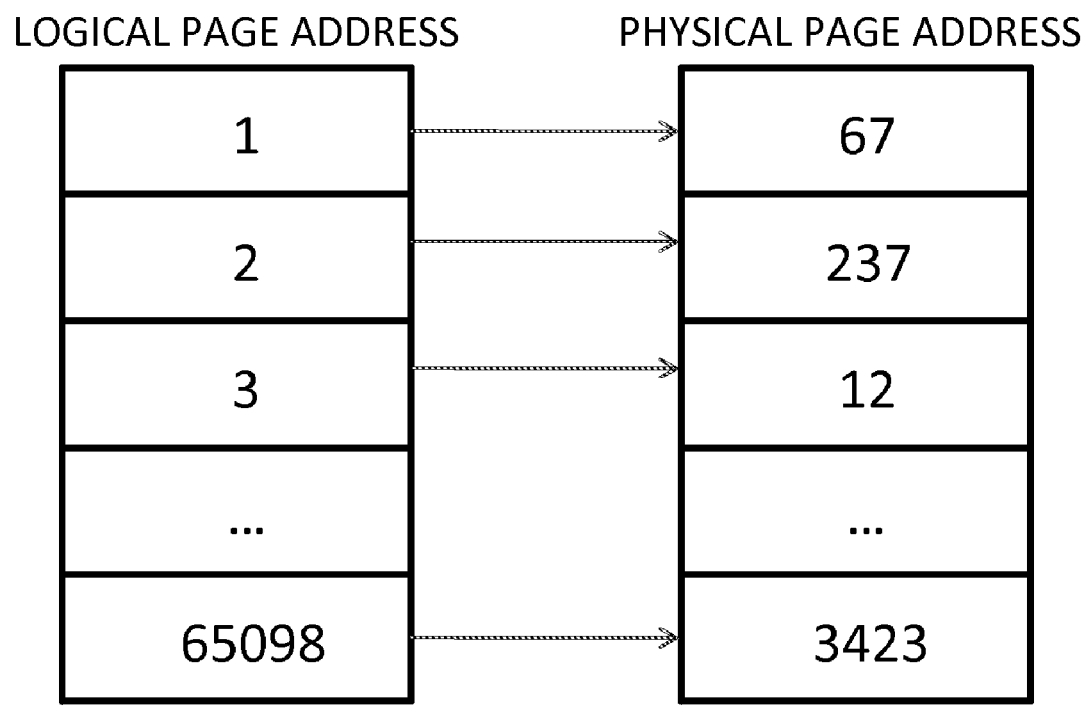
FIG. 5 is an exemplary conceptual view of a logical to physical address mapping.

Thus, flash storage drivers can maintain a mapping of flash page addresses to a logical address space. The applications using the flash see only the logical address space and may hence re-write to the same page over and over without worrying about the block-erase requirement or the wear leveling requirement. The mapping should be maintained in a memory that is fast to read and write since the mapping may change with every flash write operation. Typically, volatile memory (e.g., random access memory (RAM)) is used for storing the mapping. A conceptual view of the mapping, stored as a table is shown in FIG. 5. (The storage of the mapping in RAM may be optimized using several methods to save space in RAM and hence this table should only be treated as a conceptual view.)

Since the mapping is in a volatile memory, it may be lost if power to the volatile memory is lost. Classically, the device driver or other controller managing the mapping would store it to a persistent memory, typically the flash storage itself, before shutting down power. However, in some cases, power may be lost suddenly. This is referred to as a crash. For instance, if the flash storage is used in a mobile phone, the power may be lost when the user removes the battery without properly turning off the phone. In such cases, the mapping is lost. When the device is powered up again, the flash device driver or controller reads each page in the flash to check which logical page it corresponds to and also infers whether the page is dirty or not (e.g., this is usually possible from the extra data stored on the flash page in addition to the user application data). However, reading each page in the flash storage device is required for this recovery process and since the flash may be very large, this may take a significant amount of time and battery energy.

Aspects of the claimed subject matter can be utilized to reduce the time, and as a result also the energy, for recovery of the mapping after a crash. First, the mapping, or a compact representation of it, can be stored to the persistent memory, periodically. This process is referred to as checkpointing. Note that checkpointing by itself is not enough since the mapping may change arbitrarily in the time between the checkpointing and the crash. Again, to recover the lost changes, the entire flash storage media would have to be read, and the changes recreated.

Additionally, a mechanism is introduced that makes it possible to determine which small portion of the flash must be read in order to discover the changes since the last checkpointing. In one instance, additional information can be stored in or associated with the checkpoint that makes the flash regions affected by changes after the checkpoint deterministic. Specific methods to achieve this determinism are described later.

The overall procedure for crash recovery can be as follows. Suppose checkpointing was performed at time "t1" and a crash occurs at time "t2." As a result of a deterministic mechanism, physical pages that would have changed after the checkpointing but before the crash can be identified for unknown logical addresses that had been accessed by an application. These known physical pages can simply be read to determine which logical pages these correspond to and apply the changes to the checkpointed mapping to obtain the latest mapping that existed at the time of the crash.

Thus, only a small fraction of the entire flash storage media has to be read after a crash. The actual amount of flash read depends on the specific mechanism used to achieve determinism as well as a range from the number of pages changed to at most a few extra blocks in addition to the changed pages.

Figure 6:
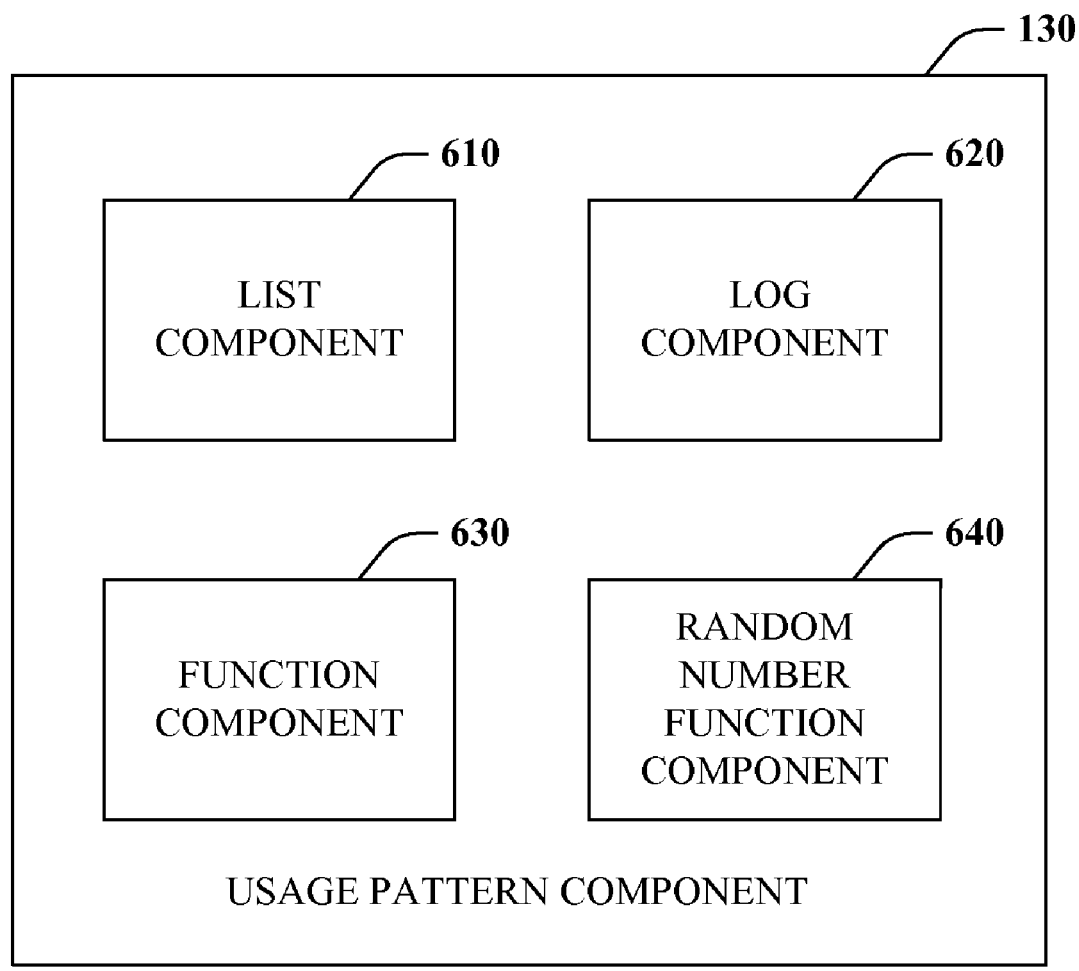
FIG. 6 is a block diagram of various embodiments of a usage pattern component in accordance aspects of the disclosed subject matter.

Turning attention to FIG. 6 various embodiments of a usage pattern component 110 are illustrated in accordance with an aspect of the claimed subject matter. Each embodiment provides a particular deterministic mechanism to facilitate identification of changes after a checkpoint, for example. As shown, FIG. 6 includes list component 610, log component 620, function component 630, and pseudo random function component 640. While each of these components is illustrated within the usage pattern component 110 it is to be appreciated that only one component (or a hybrid) at a time will embody a deterministic mechanism employed by the usage pattern component 110.

The list component 610 defines a list of free space. Free space is space or more specifically physical memory addresses that have been initialized or erased but not yet written. This defines the area to which data will be written if it is written at all. Accordingly, if a crash occurs, only this area need be read to identify changes since a characteristic of flash memory is to write to a new block rather than overwrite a current block.

By way of example, consider the previous example utilizing NAND flash and recovering a logical to physical mapping. At the time of checkpointing, the mapping of logical to physical pages is known and is stored to persistent memory. A list of pages that are known to be free can also be stored to persistent memory. The list of free pages can contain the addresses of all free pages in a particular order. A flash memory driver or the like can then utilize those pages in that order. After checkpointing and up to the time of a crash, any changes would result in pages from the free list being written. After a crash, on recovery, when the checkpointed mapping is read into memory, the free list can also be read rather than the entire memory. Reading the pages yields information on corresponding logical pages, and hence the physical page entry for the relevant logical page can be updated in the mapping. The previously stored physical address for the relevant logical page can then be marked as dirty. As soon as an empty free page is encountered, reading of further pages can cease and thus only the number of pages that have changed need to be read.

It is to be noted that the free list need not be stored in its entirety. For instance, if it can be determined that before the next checkpoint operation only "n" pages can be changed, then only the part of the list containing the first "n" pages need be stored. In addition, the list can be compacted such that consecutive addresses "23, 24, 25, 26, 27" can be stored as "23-27" to save space. Other compression mechanism can also be used. Further, instead of pages addresses, addresses of blocks including the free pages can be stored. This saves space, though some extra occupied pages may have to be read during recovery. It is also to be noted that list component 610 can also list dirty pages to help reconstruct any effect of changes to a dirty list easily after crash recovery.

The log component 620 provides a deterministic mechanism that employs special log entries. Rather than storing, an entire list of free space, log entries can be generated to indicate which flash block is being changed next. The log entry is stored to persistent storage before actually making any changes to the intended block. Subsequently, free space (e.g., free pages) can be used from the block indicated in the log entry. After a crash, during recovery, the log entries generated since the last checkpoint are read from the persistent storage and appropriate blocks or portions thereof are read to infer or otherwise determine the changed pages and relevant logical address mappings, for example. Reading the log entries can stop when the last log is reached or the identified portions of memory are found to be empty. Similar to the list embodiment, this log embodiment can also be extended to generate log entries when any dirty pages are erased and/or corresponding blocks are erased and used. This is helpful in recovering additional state such as dirty page lists in addition to logical to physical address mappings.

The function component 630 utilizes a sequential function to specify when pages are used. The position in the sequence can be stored when checkpointing. Thus, during crash recovery, the position in the sequence is read back and the sequence is generated further from that position using the known mathematical sequence generation function. Flash memory is read at addresses generated through this sequence until an empty location is reached. This indicates the new position in the sequence as well.

In this approach, a driver uses physical pages (e.g., NAND) in order of addresses generated by the sequence generation function. Hence, the sequence generation function should be chosen to generate a sequence that covers the entire range of physical page addresses. In addition, some previously used pages may become dirty when re-written to a new location. When these pages are erased and are available to be re-used, the sequence generation function should be able to generate their addresses. One example of such a sequence generation function along with the procedure to accommodate dirty pages is described here: Suppose the flash has "N" pages in total. Choose a number "K<N" (such as "K=0.9N," rounded to nearest integer). Set the sequence generation function to generate natural numbers in ascending order from "1" to "K,} i.e., "sequence=1, 2, 3, 4, . . . , K−1, K." As these "K" pages are being used, some of the previously used pages may have been marked dirty. For instance, if page "2" is re-written with an update, the driver may have written the logical page "2" to physical page "34," and the physical page "2" is now dirty. The addresses of the dirty pages depend on which logical pages are changed by an application using the flash. As these dirty pages can be re-used, the sequence of addresses generated should accommodate them. Thus, at this point, the driver collects "N−K" non-dirty pages from the first few blocks (e.g., containing pages "1, 2, . . . N−K, N−K+1, . . . ") and writes them to the empty physical page addresses "N−K, . . . K" (and updates the mapping). This frees up some space, and this space may be used to store more non-dirty pages, so that more blocks including several dirty pages can be erased and the dirty space reclaimed for re-writes. This procedure frees up several blocks, for instance beginning at page address "S" and ending at address "S+M" ("M" pages are freed up). The sequence generation function is reset to starting position "S" and ending position "E<M" (e.g., "E=0.9M," rounded to nearest integer) and continues to generate natural numbers in ascending order until it reaches "E." At this stage again, some dirty pages are erased and non-dirty pages collected to a new location. The starting and ending positions of the sequence generation are set as per the pages addresses in erases blocks.

In brief, the sequence number generation function generates natural numbers in ascending order within a range specified based on the range of empty pages, and the dirty pages are collected in one contiguous range of empty pages when the previous range of continuous empty pages becomes close to full. It may be noted that variations of the sequence generation function and other methods to accommodate dirty pages in the sequence may well be used. For instance, rather than collecting all dirty pages to a contiguous range of page addresses, the blocks of empty pages may exist in discontinuous ranges and the sequence generation function may be set to generate a sequence in the appropriate discontinuous ranges.

The pseudo-random function component 640 utilizes a pseudo-random number generated to achieve determinism. As mentioned previously, wear leveling is an important aspect of flash driver design. If a sequence generation function is such that the flash memory is used uniformly over the entire address range even when the application uses only a few pages, this is beneficial for flash longevity. Thus, pseudo-random function component 630 employs a pseudo-random number generator to generate a usage address sequence. A pseudo-random number generator generates numbers within a given range such that these numbers are randomly and uniformly distributed over the entire given range. However, they are not truly random but pseudo-random, because given a seed number and a position in the generation sequence the known pseudo-random generator identifies exactly which numbers will be generated next.

Consider the following pseudo-random number generator: "$x(n+1)=P1*x(n) \bmod N$, $n=0, 1, 2, 3, \ldots$" and "$x(0)=$some given number," where "$c=a \bmod b$" means that "c" is equal to the remainder obtained on dividing "a" by "b." For instance, "$P1=100$," "$N=2^5-1=31$," "$x(0)=10$," we get the sequence:

$n=1: x(1)=100*10 \bmod 31=8$ $n=2: x(2)=100*8 \bmod 31=25$ $n=3: x(3)=100*25 \bmod 31=20$

. . .

The sequence is "10, 8, 25, 20 . . . " and stays in the range "0 to N." This sequence generation function may be used to generate addresses randomly between any given range "S to E" by using "N=(E−S+1)" and "address=x(n)+S." Knowing the seed, "x(0)" and the position "n," the subsequent numbers in the sequence are deterministic. Thus, at a checkpointing stage, the seed and position used are also stored. When recovery takes place, the relevant page address sequence may be generated and only those pages read (until an empty page is encountered) rather than reading the entire flash.

In this approach, just as in the previous approach, the dirty pages can be accommodated. This can be achieved in a similar manner by setting the range of the random number generator to the range of empty pages, or using multiple generators for discontinuous empty ranges. Many random number generation functions are known, and hence variations of random number generation function shown above may be used, along with variations in procedure to accommodate dirty pages.

Figure 7:
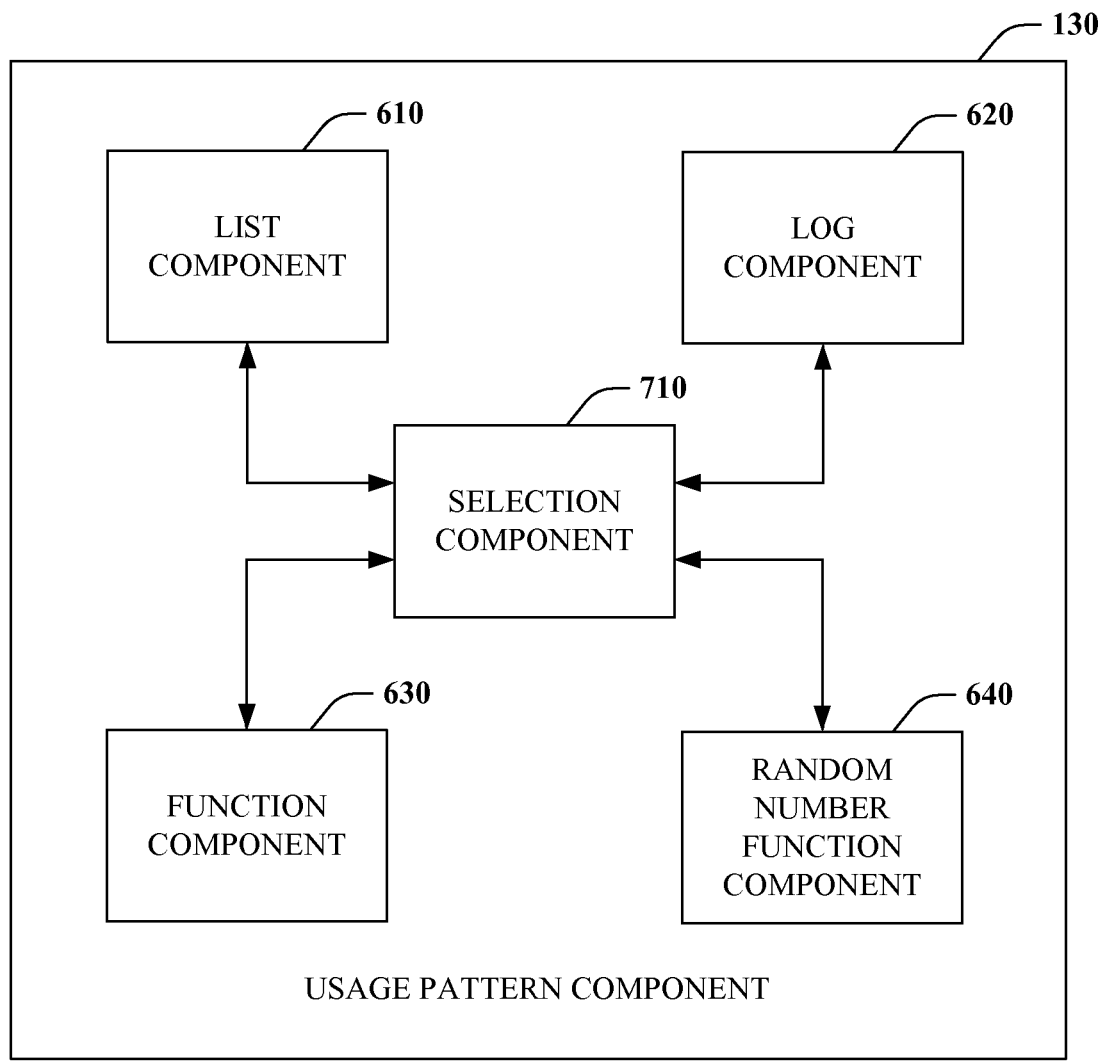
FIG. 7 is a block diagram of a representative usage pattern component in accordance with an aspect of the disclosure.

Turning to FIG. 7, a representative usage pattern component 130 is depicted in accordance with an aspect of the claimed subject matter. The usage pattern component 130 can be embodied by a plurality of different determinative mechanisms described as components themselves, namely the list component 610, log component 620, function component 630, and pseudo-random function 640, a described above with respect to FIG. 6. In a few words, each component provides a different manner for determinatively identifying flash memory space for usage. As a result, a subset of memory can be isolated for examination during recovery after a checkpoint thereby enabling rapid crash recovery. The list component 610 employs lists, the log component 620 utilizes logs, the function component 630 employs mathematical functions, and the pseudo-random function component 640 uses a pseudo-random number generator function.

Note that the usage pattern component 130 can include a selection component 710 to select amongst a plurality of mechanisms list component 610, log component 620, function component 630 and/or pseudo-random function component 640, among others (e.g., third party plug-ins). One should recognize that each mechanism provides at least slightly differing functionality. These differences can be leveraged for efficient as well as rapid recovery. The selection component 710 can identify a mechanism or hybrid of mechanisms for use as a function of application characteristics and/or other contextual information. Machine learning, deterministic rules, inferences, or other functionality can be utilized by the selection component 710 to gauge the application characteristics to select the best mechanism for usage. For instance, the selection component 710 can determine that for a particular application it best to store transaction logs rather than utilizing a free and/or dirty page list. For another application, it can be determined that it is simpler to use a sequential or pseudo-random function rather than transaction logs.

Figure 8:
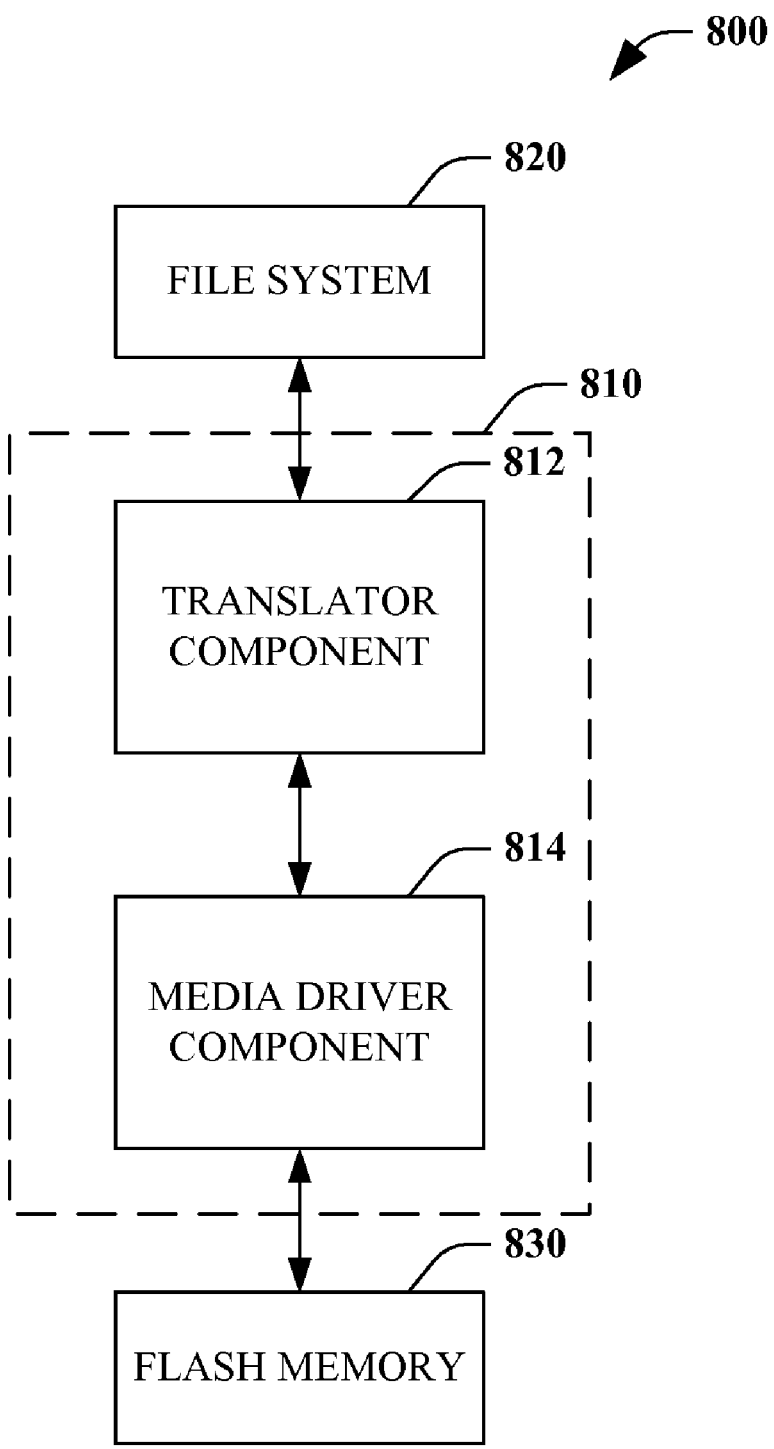
FIG. 8 is a block diagram of an exemplary architecture suitable for employment of aspects of the disclosed subject matter.

Referring to FIG. 8, an exemplary architecture 800 is illustrated in which aspects of the claimed can be practiced. A driver 820 is positioned between a file system 820 associated with a host device and the physical flash memory 830 to facilitate interaction between the two. The driver includes a translator component 112 and a media driver component 114. The translator component 112 is responsible for handling all input/output requests from the upper-level file system 820, implementing all of the necessary wear leveling operations, maintaining data integrity, as well as handling failure situations, among other things. Hence, it is here where described rapid crash recovery systems and methods can be employed. The translator component 112 passes all of the actual read/write requests on to the media driver component 830.

The media driver component 830, typically written by the original equipment manufacturer (OEM) is a simple set of entry points that are responsible for interacting with the actual flash hardware. The media driver component 830 implements program/erase algorithms necessary to read/write/erase the flash media. Through the use of the translator component 812, original equipment manufacturers are free to choose the file system to use in the target device. Additionally, they are free to choose the flash memory to utilize in the target device. Lastly, although error-correcting code (ECC) can be provided by the translator component, it can also be relegated to the media driver component 814. As a result, OEMs can also select the ECC codec (if any) to employ for their respective memory device.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the selection component 710 can employ such mechanisms to infer the best deterministic mechanism to employ to dictate flash memory usage and subsequent recovery.

Figure 9:
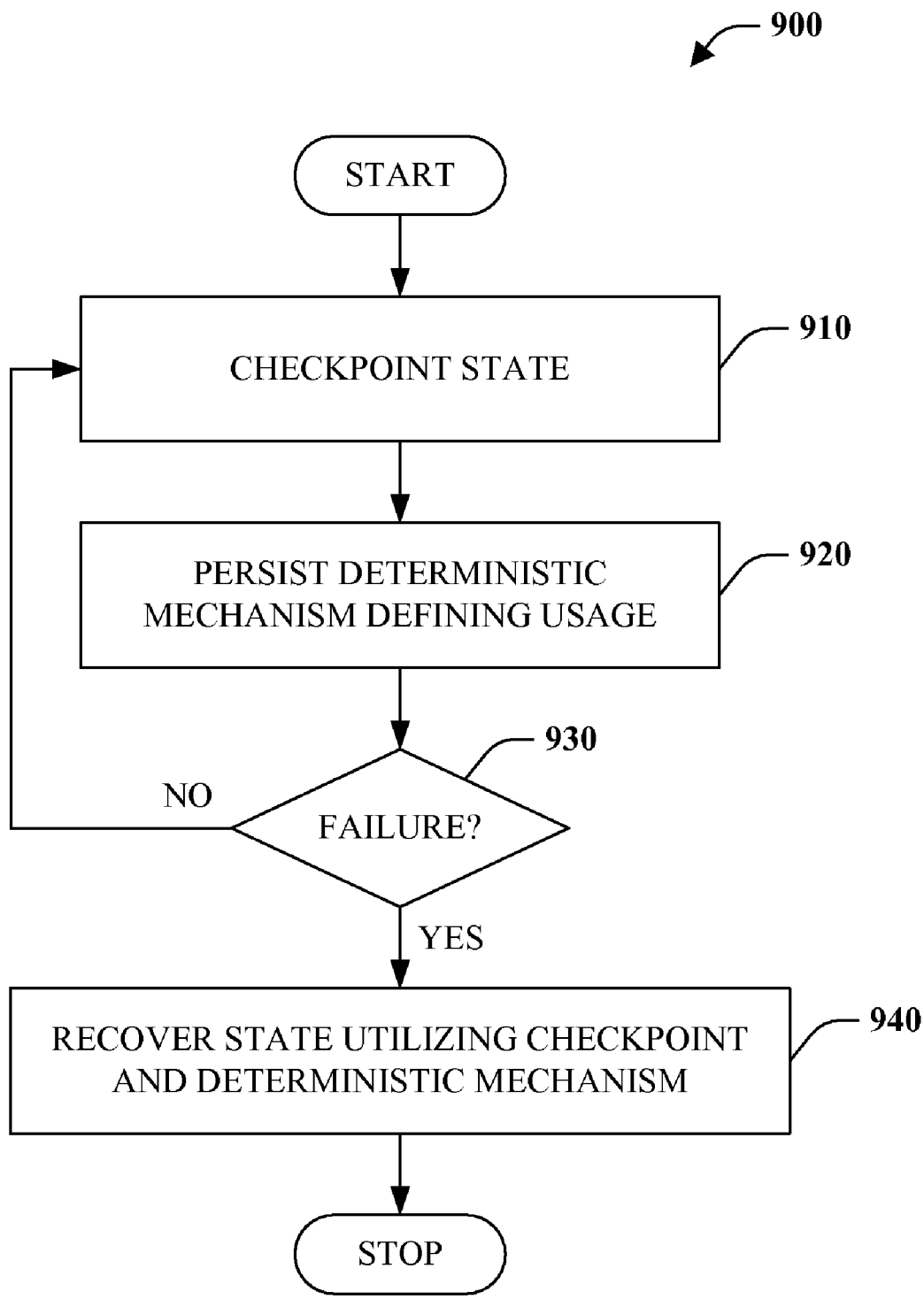
FIG. 9 is a flow chart diagram of a rapid recovery method associated with flash memory storage in accordance with an aspect of the disclosed subject matter.
Figure 10:
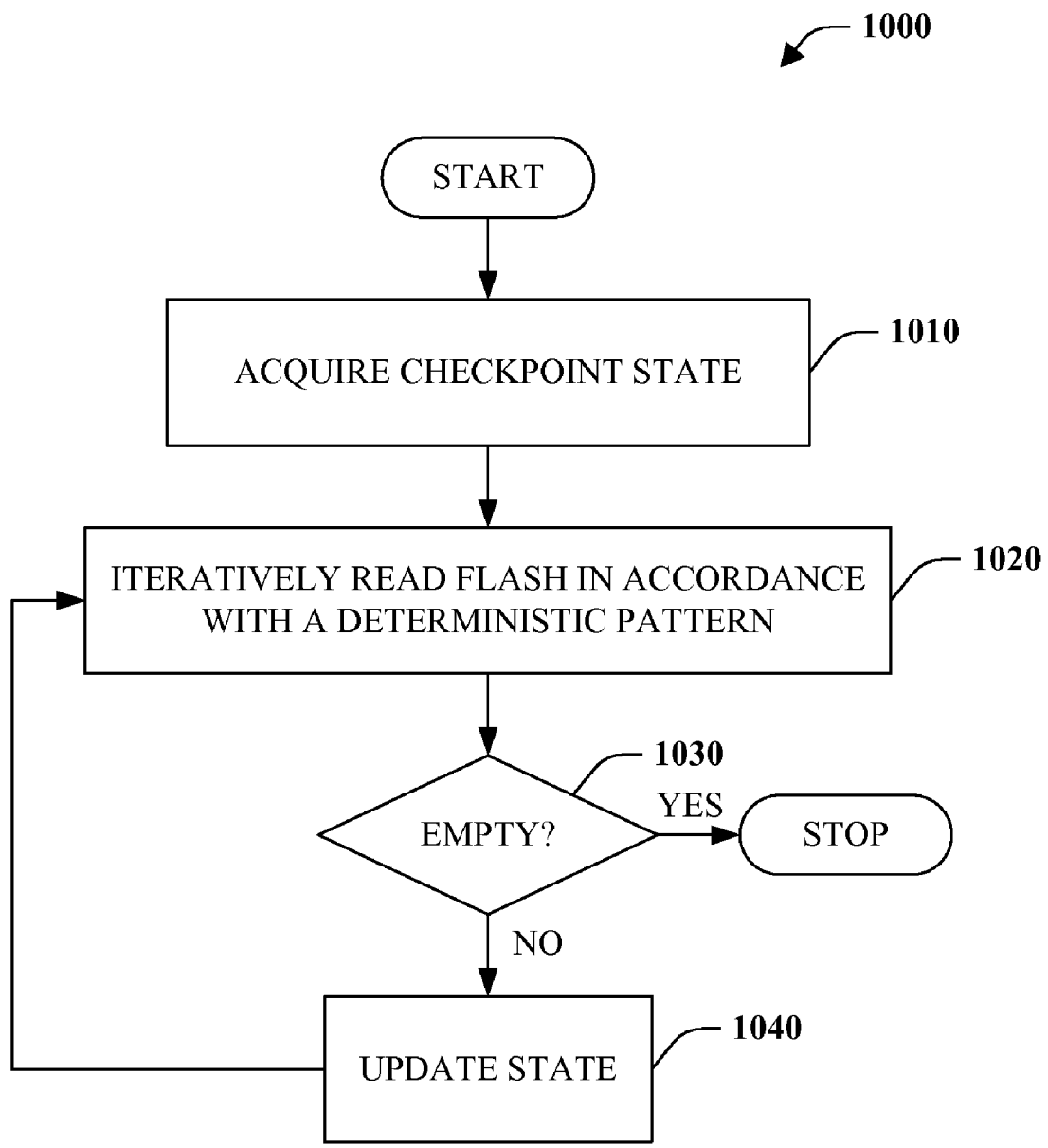
FIG. 10 is a flow chart diagram of a method for recovering changes utilizing a deterministic mechanism in accordance with an aspect of the disclosed subject matter.

In view of the exemplary systems described supra, methodologies that may be implemented in accordance with the disclosed subject matter will be better appreciated with reference to the flow charts of FIGS. 9 and 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 9, a rapid crash recovery method 900 for flash memory storage is illustrated in accordance with an aspect of the claimed subject matter. At reference numeral 910, state is checkpointed or persisted to nonvolatile storage such as flash memory or a host device store. In accordance with one aspect of the disclosed subject matter, state can correspond to a logical to physical mapping; however, claims are not limited thereto.

A deterministic mechanism and/or information pertaining thereto can be persisted to a nonvolatile store at reference 920 to supplement the checkpoint data. The deterministic mechanism defines a flash memory usage pattern wherein a subsequent action can be determined from a current state. Deterministic mechanisms can utilize lists of free space, special log entries, and/or mathematical functions including sequence generators and pseudo-random number generators.

At reference numeral 930, a determination is made as to whether a failure or crash has occurred such as that resulting from a sudden loss of power. If a failure has not occurred, the method 900 can loop, wherein additional checkpoints can be set and usage information saved. If at 930 a failure is detected, the checkpoint information and deterministic mechanism can be utilized to recover state rapidly after the crash. This can be accomplished by setting state equal to that persisted by a checkpoint. Furthermore, the deterministic mechanism can be utilized to redo transactions that occurred subsequent to the checkpoint but prior to the failure. In this manner, only a subset of flash memory or other non-volatile store need be read to recreate state information lost due to the crash.

Turning to FIG. 10, a restoration method 1000 is depicted in accordance with an aspect of the claimed subject matter. Method 1000 provides more detail regarding the redo of transactions or the recreation of state and/or other information subsequent to a crash. At reference numeral 1010, the most recent checkpointed state is acquired form a non-volatile store such as flash memory or a host device store. In one instance, this can correspond to a logical to physical mapping. At numeral 1020, flash memory or the like can be iteratively read in accordance with a deterministic pattern. For example, physical addresses can be examined as specified by a list, log, and/or function. Metadata can be acquired from each location, which can be employed to recreate state.

Upon each read, a determination can be made at 1030 pertaining to whether the accessed location is empty. If no, the method 1000 can proceed to numeral 1040 where the checkpoint state can be updated by information obtained from the store. For example, metadata at a physical memory address can indicate which logical address it is associated with to facilitate logical to physical map regeneration. The method 1000 continues to loop until an empty address is located. If anything else were to have been written to flash memory, or the like, it would have been written to this location in accordance with a deterministic pattern. This means no more changes were recorded. Accordingly, the restoration method 1000 can terminate. As will be appreciated, by utilizing a deterministic mechanism to specify flash memory usage, later during recovery, only a subset of the memory need be read to redo changes made between a checkpoint and a crash. This provides considerable improvement in performance over a method that requires reading of every flash memory address especially where the flash memory is substantially large.

It is to be appreciated that the provided systems and methods related to recovery are employable with respect to a plurality of conventional and future storage media. For example, they are applicable to flash memory including NAND flash, NOR flash, MLC (multi-level cell) flash, SLC (single-level cell) flash and large block flash. Moreover, even though aspects have been described herein with respect to flash memory other non-flash technologies are also contemplated and intended to be within the scope of the claimed subject matter. Further, techniques are relevant to, but not limited to, any storage device where logical to physical mappings (or other state information) are maintained in volatile memory and the sequence of access in the storage device is not inherently predictable for any arbitrary access made by an application utilizing the storage device.

As used herein, the terms "component," "system" and the like are intended to refer to a computer-related entity, either hardware, a combination of hardware and software, software, or software in execution. For example, a component can be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
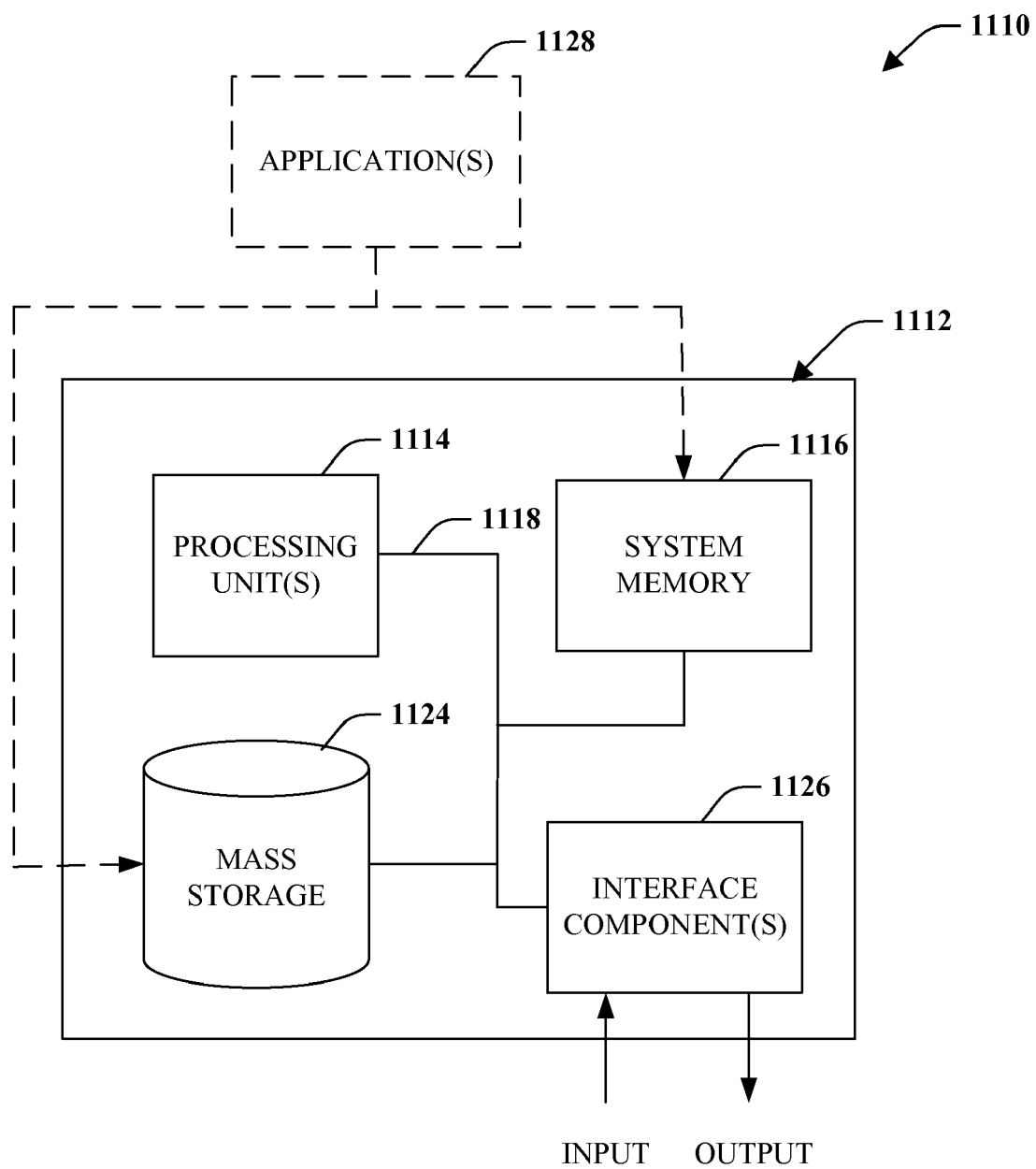
FIG. 11 is a schematic block diagram illustrating a suitable operating environment for aspects of the subject disclosure.
Figure 12:
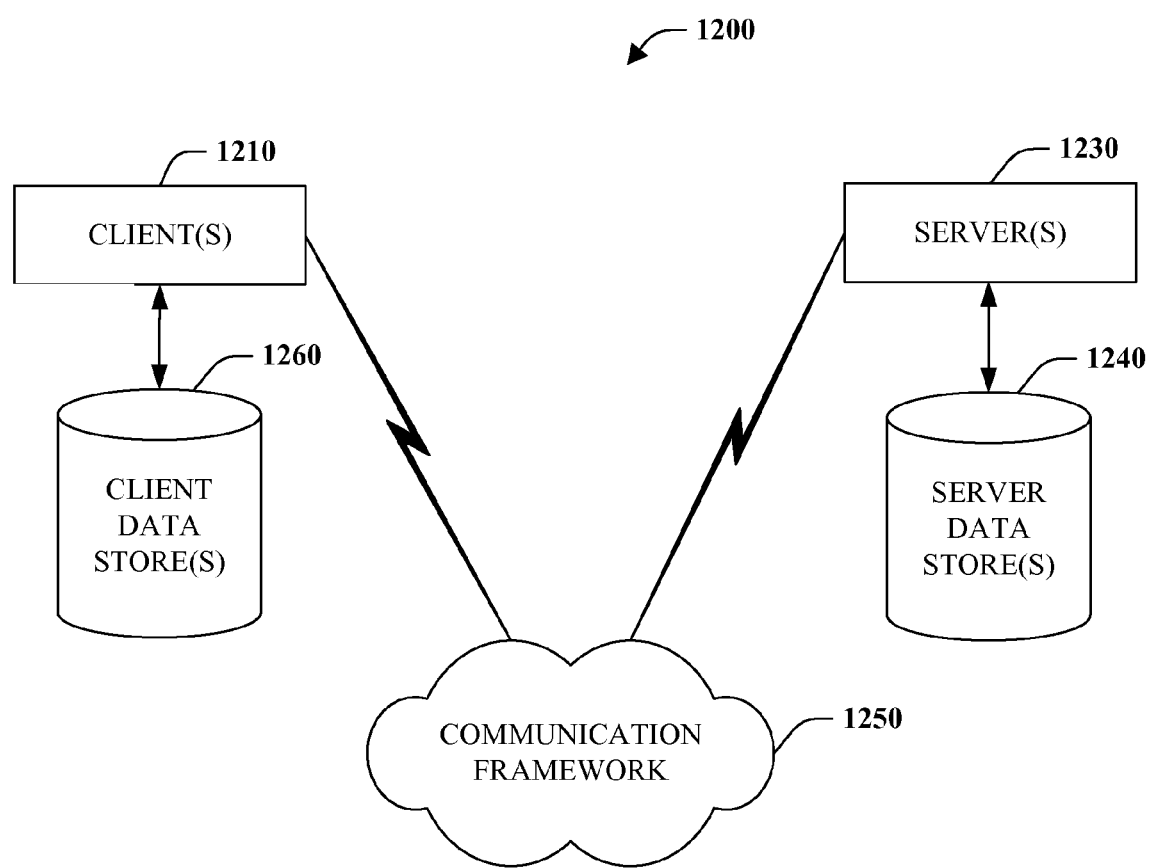
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

Client/server interactions can be utilized with respect to crash recover as described herein. By way of example and not limitation, a client 1210 can correspond to a flash memory host device (e.g., phone, personal digital assistant, laptop, media player . . . ) that can download a driver or the like including the disclosed rapid recovery functionality from a server 1230 utilizing the communication framework 1250. Similarly, the rapid recovery system can be pluggable allowing new deterministic mechanisms/components to be retrieved from the server 1230 and/or associated service across the communication framework 1250.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A system to facilitate crash recovery with respect to flash storage, comprising:
    at least one processor coupled to at least one computer readable storage medium storing instructions executable by the at least one processor to implement:
    an acquisition component configured to acquire checkpoint data;
    a selection component configured to select a deterministic flash usage pattern from among a plurality of deterministic flash usage patterns respectively corresponding to a plurality of deterministic flash usage pattern generating mechanisms; and
    a restoration component configured to restore a flash processing state as a function of the checkpoint data and a deterministic flash usage pattern selected by the selection component, wherein the selected deterministic flash usage pattern is to be employed to identify changes made after a checkpoint.

2. The system of claim 1, further comprising a checkpoint component configured to capture the checkpoint data at least one of periodically or upon occurrence of one or more events.

3. The system of claim 2, wherein the checkpoint data includes a logical to physical mapping.

4. The system of claim 1, wherein the selection component is further configured to identify a hybrid of the deterministic flash usage pattern generating mechanisms for use at least in part as a function of application characteristics.

5. The system of claim 1, wherein the selected deterministic flash usage pattern corresponds to a list that identifies free and/or dirty space.

6. The system of claim 1, is wherein the selected deterministic flash usage pattern corresponds to a log that identifies at least one of free or dirty space.

7. The system of claim 1, wherein the plurality of deterministic flash usage pattern generating mechanisms include a sequence generation function.

8. The system of claim 4, wherein the plurality of deterministic flash usage pattern generating mechanisms include a pseudorandom sequence generation function.

9. The system of claim 4, wherein the selection component is configured to select the deterministic flash usage pattern at least in part as a function of application characteristics.

10. The system of claim 1, wherein the acquisition component, the selection component and the restoration component form at least part of at least one of a flash driver or microcontroller.

11. A method to facilitate rapid crash recovery with respect to flash memory, comprising:
    generating a checkpoint comprising state information pertaining to flash memory utilization;
    selecting a deterministic manner of storage usage from among a plurality of deterministic manners of storage usage;
    persisting additional checkpoint information pertaining to the selected deterministic manner of storage usage after a checkpoint; and
    recovering flash memory state information after a crash utilizing the checkpoint and additional checkpoint information.

12. The method of claim 11, wherein the persisting additional checkpoint information comprises storing a free storage unit list.

13. The method of claim 11, wherein the persisting additional checkpoint information comprises storing logs identifying free space usage.

14. The method of claim 13, further comprising storing the logs prior to making any changes.

15. The method of claim 13, further comprising generating and storing log entries identifying at least one of dirty space erasure or block erasure.

16. The method of claim 11, wherein the persisting additional checkpoint information comprises identifying a position in a sequence.

17. The method of claim 16, further comprising reading the position and identifying further positions based on a sequence generation function.

18. The method of claim 17, further comprising utilizing a pseudo-random sequence generation function.

19. The method of claim 11, further comprising:
    reading a subset of data from flash memory in accordance with the additional information; and
    updating a state captured by the checkpoint as a function of the subset of data.

20. A computer-readable storage medium storing instructions, the instructions to, if executed by a computing device, cause the computing device to perform operations comprising:
    selecting a deterministic flash usage pattern for usage of a flash memory from among a plurality of deterministic flash usage patterns, based at least in part on an application using the flash memory; and
    recovering changes made subsequent to a checkpoint taken of a state of the flash memory at least in part as a function of the selected deterministic flash usage pattern.

* * * * *

UNITED STATES PATENT AND TRADEMARK OFFICE
CERTIFICATE OF CORRECTION

PATENT NO.        : 7,818,610 B2
APPLICATION NO.   : 11/863023
DATED             : October 19, 2010
INVENTOR(S)       : Andrew M. Rogers et al.

It is certified that error appears in the above-identified patent and that said Letters Patent is hereby corrected as shown below:

In column 15, line 38, in Claim 8, delete "pseudorandom"
and insert -- pseudo-random --, therefor.

Signed and Sealed this
Eighth Day of February, 2011

David J. Kappos
*Director of the United States Patent and Trademark Office*